US011810355B2

(12) United States Patent
Toyoda

(10) Patent No.: US 11,810,355 B2
(45) Date of Patent: Nov. 7, 2023

(54) GRATITUDE DELIVERY FOR MANUFACTURED PRODUCTS

(71) Applicant: Toyota Research Institute, Inc., Los Altos, CA (US)

(72) Inventor: Heishiro Toyoda, Mountain View, CA (US)

(73) Assignee: Toyota Research Institute, Inc., Los Altos, CA (US)

(*) Notice: Subject to any disclaimer, the term of this patent is extended or adjusted under 35 U.S.C. 154(b) by 112 days.

(21) Appl. No.: 17/379,156

(22) Filed: Jul. 19, 2021

(65) Prior Publication Data
US 2023/0019317 A1    Jan. 19, 2023

(51) Int. Cl.
*G06V 20/40* (2022.01)
*G06T 7/00* (2017.01)
*G06V 40/16* (2022.01)

(52) U.S. Cl.
CPC ............ *G06V 20/46* (2022.01); *G06T 7/0004* (2013.01); *G06V 20/41* (2022.01); *G06V 20/49* (2022.01); *G06V 40/174* (2022.01); *G06T 2207/10016* (2013.01); *G06T 2207/30201* (2013.01); *G06T 2207/30232* (2013.01); *G06V 2201/07* (2022.01)

(58) Field of Classification Search
CPC ... G06V 20/597; G06V 40/166; B60W 40/09; B60W 2040/0818; B60W 2420/42
See application file for complete search history.

(56) References Cited

U.S. PATENT DOCUMENTS

| | | | |
|---|---|---|---|
| 8,630,819 B2 | 1/2014 | English et al. | |
| 9,269,151 B2 | 2/2016 | Zahand | |
| 10,325,102 B2 | 6/2019 | Tlrumala | |
| 10,332,376 B2 * | 6/2019 | Lin | G06Q 10/1091 |
| 10,872,160 B2 | 12/2020 | Tlrumala | |
| 11,482,030 B2 * | 10/2022 | Ionescu | G06V 10/764 |
| 2014/0344014 A1 | 11/2014 | MacInnis | |
| 2014/0367463 A1 | 12/2014 | Cibor | |
| 2017/0046694 A1 | 2/2017 | Chow et al. | |
| 2018/0293597 A1 | 10/2018 | Koese et al. | |
| 2018/0339456 A1 * | 11/2018 | Czinger | B29C 70/205 |
| 2021/0389889 A1 * | 12/2021 | Tsai | G06Q 10/06315 |

* cited by examiner

*Primary Examiner* — Santiago Garcia
(74) *Attorney, Agent, or Firm* — Christopher G. Darrow; Darrow Mustafa PC

(57) ABSTRACT

Systems, methods, and other embodiments described herein relate to an improved approach to providing gratitude between consumers and workers. In one embodiment, a method includes acquiring from a camera within a manufacturing facility, source video of manufacturing of different stages of a product. The method includes identifying, from the source video, segments associated with the product. The method includes generating a combined video from the segments. The method includes providing the combined video to a consumer associated with the product.

20 Claims, 6 Drawing Sheets

GRATITUDE DELIVERY FOR MANUFACTURED PRODUCTS

TECHNICAL FIELD

The subject matter described herein relates, in general, to systems and methods for capturing the production and delivery of a product using video, and, more particularly, to displaying a video to a consumer and providing an impression of the consumer to a manufacturing worker to show gratitude for the product.

BACKGROUND

Consumers and workers (i.e., those that build products) are often disconnected, having little to no interaction because of modern manufacturing practices. That is, a consumer is unlikely to ever meet a worker that built a car, smartphone, or another device that is built in a large manufacturing facility especially considering that the facility may be in another country. Accordingly, whereas traditionally, a creator may interact directly with consumers and thus receive direct gratitude from the consumers, now such occurrences are rare. Consequently, manufacturing worker's morale may suffer from a lack of realizing how their work impacts the consumers, and likewise, consumers may not fully appreciate the efforts of workers in creating a product.

SUMMARY

In one embodiment, example systems and methods relate to an improved approach to providing gratitude between consumers and manufacturing workers. As previously noted, consumers and workers are often unknown to one another, thereby inducing a disconnect between the origins of a product and the use of a product. This disconnect can fuel reduced morale in workers that do not see the use of the products they labor to create and also diminished brand loyalty of consumers that do not see the involvement of workers in creating the products.

Therefore, in one arrangement, a gratitude system functions to gather information about the manufacturing of a product, including at least a video of workers performing different steps in the manufacture and assembly of the product that can then be shown to consumers that ultimately purchase the product. For example, consider that a manufacturing facility may include a plurality of video cameras that may be present for quality control purposes or simply for capturing video of the manufacturing and assembly of a product. Thus, the videos generally include the workers performing tasks to complete the creation of the product. As such, the system can capture video of the workers performing the tasks on individual components and assembling multiple separate components together in order to capture the full manufacturing process. Of course, while manufacturing is discussed as an implementation of the present approach, in further arrangements, the system may apply to food production/cooking, and so on.

In any case, the system functions to gather videos of separate stages of the manufacturing process and then assembles a combined video that includes the separate stages with the workers performing respective tasks. The system may track the product and separate components using a blockchain that identifies characteristics of each component and further links videos associated with each component together. The system can then edit the separate video segments to identify instances where workers are best portrayed as smiling, working hard, and so on. After filtering the video segments, the system generates the combined video that highlights the manufacturing process of the individual product. As such, each separate product will have a unique combined video that portrays separate stages of the manufacturing of the specific product, including, for example, manufacturing of individual components and assembly of the individual components together into sub-components and a final product, all while capturing actions of the workers.

The system can then provide the combined video to a consumer when the consumer receives the product. Accordingly, through viewing the combined video about the specific product that the consumer owns, the system connects the consumer to the manufacturing workers and helps the consumer to realize a connection with the workers. Moreover, to further capture the appreciation and gratitude of the consumer, the system can acquire a video of the consumer receiving the product and/or watching the video about the product. Similar to the way in which the system generates the combined video, the system can also generate a consumer video of this experience. Thereafter, the system conveys the consumer video to the manufacturing workers to show the workers the enjoyment and general gratitude of the consumer when receiving the product. In this way, the system can convey the gratitude of the consumer to the manufacturing worker, thereby improving the morale of the worker.

In one embodiment, a gratitude system is disclosed. The gratitude system includes one or more processors and a memory communicably coupled to the one or more processors. The memory stores a monitoring module including instructions that, when executed by the one or more processors, cause the one or more processors to acquire, from a camera within a manufacturing facility, source video of manufacturing of different stages of a product. The monitoring module including instructions to identify, from the source video, segments associated with the product. The monitoring module including instructions to generate a combined video from the segments. The monitoring module including instructions to provide the combined video to a consumer associated with the product.

In one embodiment, a non-transitory computer-readable medium including instructions that, when executed by one or more processors, cause the one or more processors to perform various functions is disclosed. The instructions include instructions to acquire, from a camera within a manufacturing facility, source video of manufacturing of different stages of a product. The instructions include instructions to identify, from the source video, segments associated with the product. The instructions include instructions to generate a combined video from the segments. The instructions include instructions to provide the combined video to a consumer associated with the product.

In one embodiment, a method is disclosed. The method includes acquiring, from a camera within a manufacturing facility, source video of manufacturing of different stages of a product. The method includes identifying, from the source video, segments associated with the product. The method includes generating a combined video from the segments. The method includes providing the combined video to a consumer associated with the product.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Figure 1:
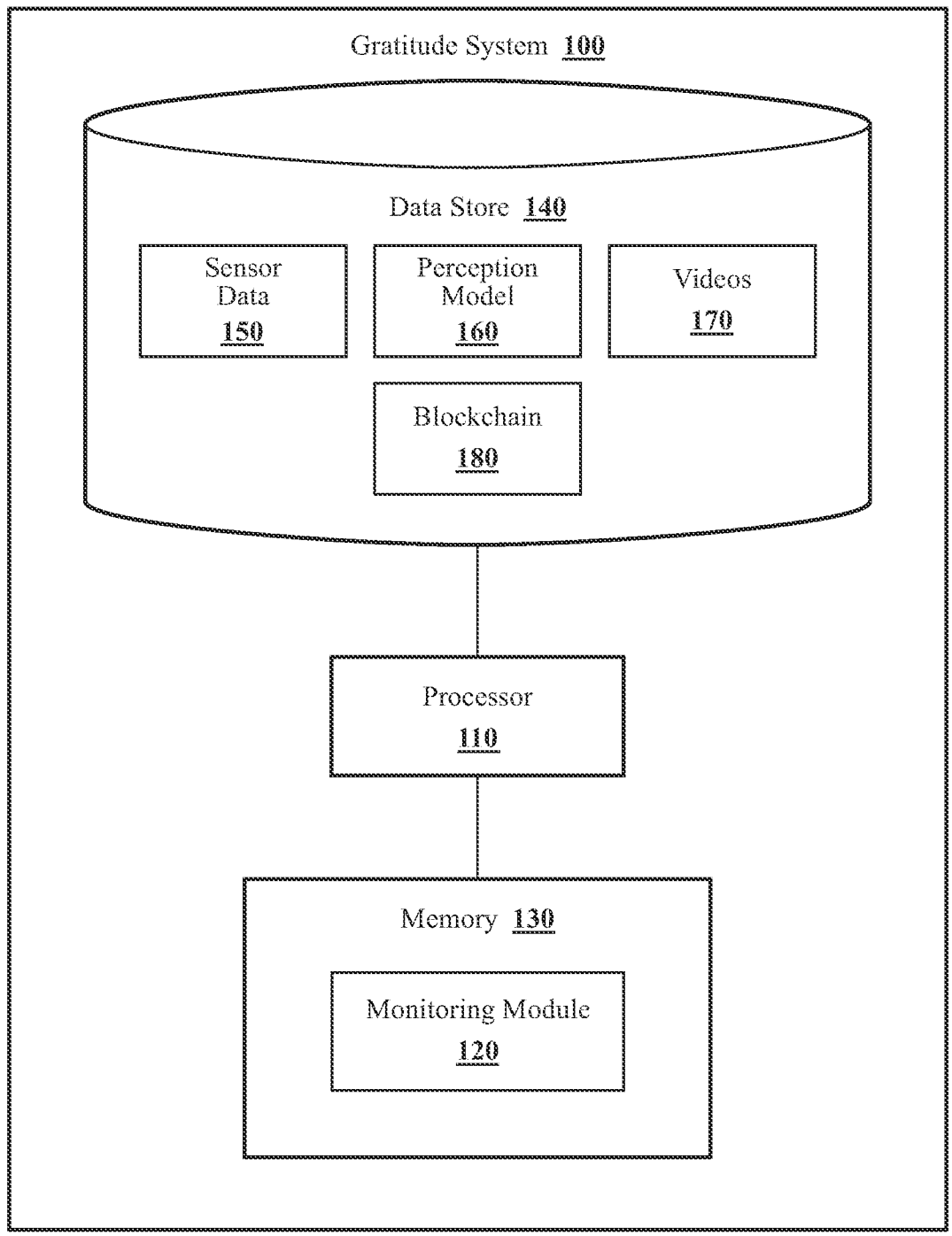
FIG. 1 illustrates one embodiment of a gratitude system that is associated with capturing and processing video to connect workers and consumers.

Systems, methods, and other embodiments associated with an improved approach to providing gratitude between consumers and manufacturing workers are disclosed. As previously noted, consumers and workers are often unknown to one another, thereby inducing a disconnect between origins of a product and the use of a product. This disconnect can fuel reduced morale in workers that do not see the use of the products they labor to create and also diminish brand loyalty of consumers that do not see the involvement of workers to create the products.

Therefore, in one arrangement, a gratitude system functions to gather information about the manufacturing of a product. In one arrangement, the information includes video of workers performing different steps in the manufacture and assembly of the product that can then be shown to consumers that ultimately purchase the product. For example, consider that a manufacturing facility may include a plurality of video cameras. The cameras may be visible lights cameras, RGB cameras, and so on that perform quality control functions or that simply capture video of the manufacturing and assembly of a product. Thus, the videos generally include the workers performing tasks to complete the creation of the product. As such, the system can capture video of the workers performing the tasks on individual components and assembling multiple separate components together in order to capture the full manufacturing process.

Thus, in at least one arrangement, the system implements a blockchain that tracks components and the manufacturing of the end product such that information about each component and manufacturing step is logged into the blockchain at each stage in an immutable manner. Accordingly, the system may further embed video from each stage into the blockchain in order to track the video segments that correspond with the manufacturing of a particular product. Of course, in further arrangements, the system may use other approaches to tag or otherwise label the video according to specific part identifiers (e.g., RFID, visual fiducials, etc.) so that the separate stages for an individual product can be traced.

In any case, the system functions to gather videos of separate stages of the manufacturing process and then assembles a combined video. The combined video functions to highlight the manufacturing of the product at the separate stages and includes, in particular, depictions of the workers performing tasks in the manufacturing process. The system can identify and filter the separate video segments when generating the combined video. In one approach, the system discriminates between separate segments of the video by determining how the workers are portrayed, including whether the workers are smiling, working hard, and so on. The process of identifying which segments to include within a combined video can include applying image perception through the use of a machine-learning model that identifies workers depicted in the images and expressions of the workers in order to ascertain which segments are appropriate.

After filtering the video segments, the system generates the combined video that highlights the manufacturing process of an individual product. Accordingly, the system generates the combined video such that each separate product will have a unique combined video that portrays separate stages of the manufacturing of the specific product, including, for example, manufacturing of individual components and assembly of the individual components together into subcomponents and a final product all while capturing actions of the workers. The system can then provide the combined video to a consumer when the consumer receives the product.

Through viewing the combined video about the specific product, the system connects the consumer to the manufacturing workers and helps the consumer to realize a connection with the workers. Moreover, to further capture the appreciation and gratitude of the consumer, the system can acquire video of the consumer receiving the product and/or watching the video about the product. Similar to the way in which the system generates the combined video, the system can also generate a consumer video of this experience. Thereafter, the system conveys the consumer video to the manufacturing workers to show the workers the enjoyment and general gratitude of the consumer when receiving the product. In this way, the system can convey the gratitude of the consumer to the manufacturing worker, thereby improving the morale of the worker.

Referring to FIG. 1, one example of a gratitude system 100 that functions to capture video of both workers and consumers and generate videos for display is shown. While depicted as a standalone component, in one or more embodiments, the gratitude system 100 is cloud-based and thus can include elements that are distributed among different locations. For example, in at least one arrangement, the gratitude system 100 includes sensors or at least communicative connections with sensors that are located in different locations, such as manufacturing facilities, retail locations, and so on. In general, the gratitude system 100 is implemented to acquire information from the various locations to support the functions discussed herein. That is, in at least one approach, the gratitude system 100 functions to acquire information from cameras and/or other sensors about the manufacturing and subsequent delivery of a product from which the system can generate and display videos of the processes. The noted functions and methods will become more apparent with a further discussion of the figures.

With further reference to FIG. 1, one embodiment of the gratitude system 100 is further illustrated. The gratitude system 100 is shown as including a processor 110. Accordingly, the processor 110 may be a part of the gratitude system 100, or the gratitude system 100 may access the processor 110 through a data bus or another communication path. In one or more embodiments, the processor 110 is an application-specific integrated circuit (ASIC) that is configured to implement functions associated with a monitoring module 120. In general, the processor 110 is an electronic processor, such as a microprocessor that is capable of performing various functions as described herein. In one embodiment, the gratitude system 100 includes a memory 130 that stores the monitoring module 120 and/or other modules that may function in support of generating depth information. The memory 130 is a random-access memory (RAM), read-only memory (ROM), a hard disk drive, a flash memory, or other suitable memory for storing the monitoring module 120. The monitoring module 120 is, for example, computer-readable instructions that, when executed by the processor 110, cause the processor 110 to perform the various functions disclosed herein. In further arrangements, the monitoring module 120 is a logic, integrated circuit, or another device for performing the noted functions that includes the instructions integrated therein.

Figure 2:
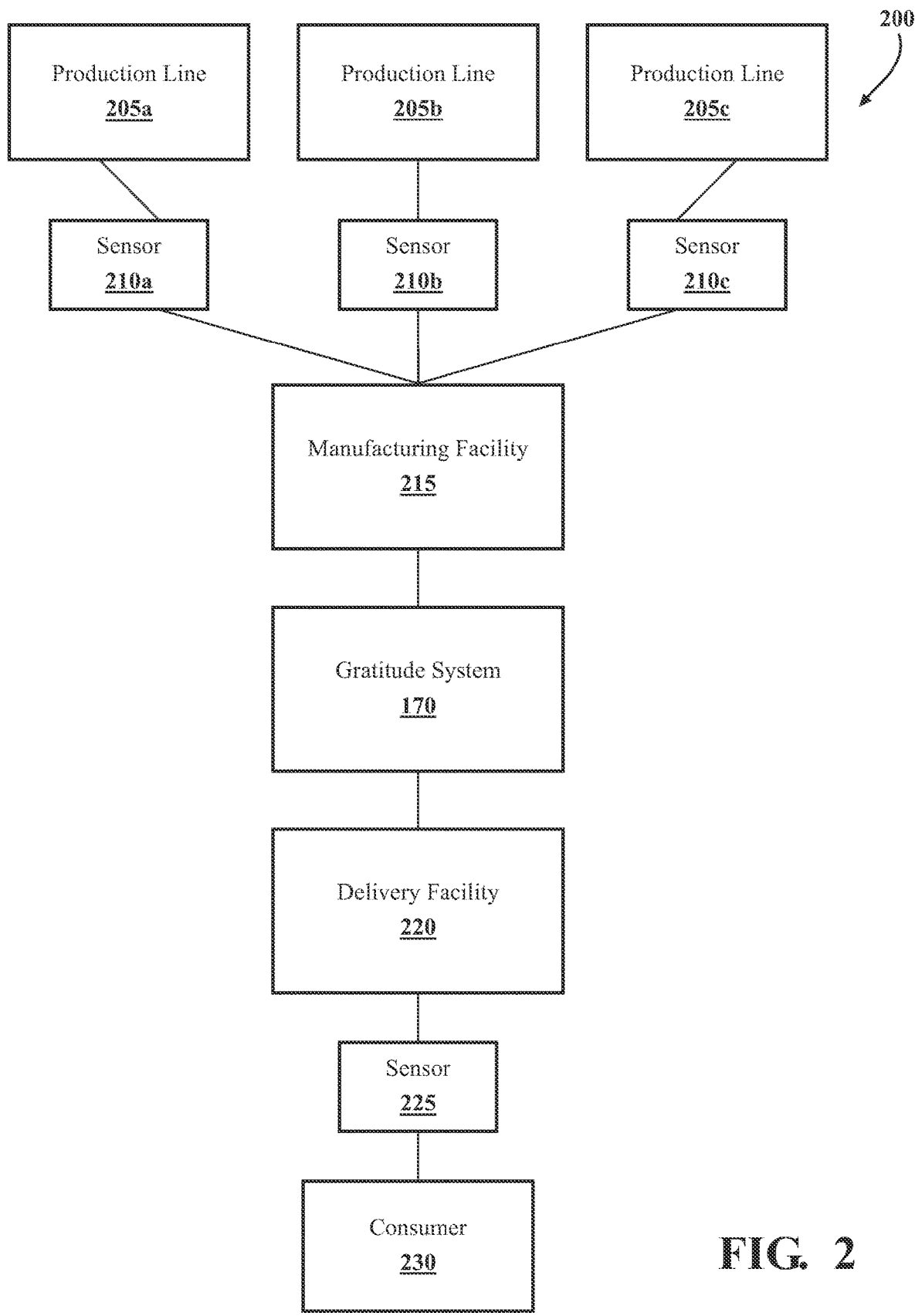
FIG. 2 illustrates a diagram depicting one example of a context for the manufacturing and delivery for a product in relation to the gratitude system of FIG. 1.

Furthermore, in one embodiment, the gratitude system 100 includes a data store 140. The data store 140 is, in one arrangement, an electronic data structure stored in the memory 130 or another electronic medium, and that is configured with routines that can be executed by the processor 110 for analyzing stored data, providing stored data, organizing stored data, and so on. Thus, in one embodiment, the data store 140 stores data used by the monitoring module 120 in executing various functions. For example, as depicted in FIG. 2, the data store 140 includes sensor data 150, a perception model 160 that is, in at least one approach, a machine-learning model, videos 170, and a blockchain 180, along with, for example, other information that is used and/or produced by the monitoring module 120. While the gratitude system 100 is illustrated as including the various elements, it should be appreciated that one or more of the illustrated elements may not be included within the data store 140 in various implementations. For example, the gratitude system 100, in one approach, may not include the blockchain 180 but may instead access the blockchain 180 as a remote/cloud-based asset. In any case, the gratitude system 100 stores various data elements in the data store 140 to support functions of the monitoring module 120.

Continuing with the highlighted data elements, the sensor data 150 includes, for example, at least video and may further include additional information, including RFID data, visual fiducial information, and so on. In general, the information that is in addition to the video may function to facilitate identifying particular component parts within the video and/or particular workers in order to correlate components of final products and which workers are associated with a particular product. Further, as described herein, the video data that is included within the sensor data 150 is, for example, data from an imaging device of a depicted scene that can include red-green-blue (RGB) video, stereo video, infrared video, or other forms of video that encompass a field-of-view (FOV) that captures the production of the product or the consumer receiving the product. Accordingly, as will be discussed in greater detail subsequently, the sensor data 150 can include video and other data from a multiplicity of sources. For example, a manufacturing facility may include one or more cameras at each separate stage of production in order to capture information about the manufacturing process. Thus, the cameras, either directly or in combination with additional computing components, function to acquire the sensor data 150 and communicate the sensor data 150 to the system 100.

Continuing with elements shown in the data store 140, the perception model 160 is, in one arrangement, a machine-learning model that can be implemented as a convolutional neural network (CNN) or another deep neural network (DNN). In any case, the perception model 160 functions to process the sensor data 150, and, in particular, the images from the video to identify different aspects of the scene, such as when particular actions are occurring (e.g., assembly of parts), when a worker is present, determining a type of expression and/or action of the worker, and so on. Thus, the perception model 160 may perform multiple tasks, including object identification and localization, facial expression analysis, and so on. As such, the perception model 160 may include multiple different models, may include a shared backbone (e.g., a shared encoder with separate decoders), or may take another form that provides for performing the noted functions.

In any case, FIG. 1 further illustrates the data store 140 as including the videos 170. The videos 170 are videos that the monitoring module 120 generates from the sensor data 150. Accordingly, the videos 170 include combined videos that the monitoring module 120 derives from segments of video in the sensor data 150. For example, the videos 170 can include combined videos that are comprised of segments about the production of an individual product. The system 100 forms the combined videos by splicing together multiple different segments about the creation of an individual product. That is, each separate combined video follows the manufacturing of a single product from the manufacturing of subcomponents (e.g., engine, body panels, axles, etc. in relation to a vehicle) up to the assembly of the subcomponents together into a final product. As will be discussed further subsequently, the monitoring module 120 identifies the segments associate with a particular product and filters the segments to best highlight the interactions of a worker with the product. The resulting combined video is specific to one product and is, therefore, a unique accounting of the manufacturing for that product.

Additionally, the videos 170 also include consumer videos. The consumer videos are, in at least one arrangement, videos derived from segments captured when a consumer receives a product and/or watches a combined video about the manufacturing of a product. Thus, the consumer video for an individual product generally depicts the consumer and a reaction of the consumer when receiving the product. Similar to the combined video, the consumer video can be spliced together from segments in order to form a highlight of the experience of the consumer. Moreover, with knowledge of which workers correlate with the specific product as may be embedded in the associated combined video or the blockchain 180, the system 100 can provide the consumer video back to the workers.

In any case, continuing with the elements of the data store 140, the blockchain 180 is a set of records that are linked together according to, for example, a cryptographic hash that makes the blockchain 180 immutable. In various implementations, the blockchain 180 may be a distributed ledger for tracking various records that is maintained by a peer-to-peer network. Within the context of the gratitude system 100, the blockchain 180 tracks the manufacturing of the product at separate stages by, for example, logging data about each separate component and the assembly of components, including component identifiers, manufacturing line information, transportation information, worker information, environmental conditions, and so on. In general, the blockchain 180 is a robust and immutable record for tracking the manufacturing process in relation to individual products. The blockchain 180 may also store data, such as the sensor data 150, including associations with relevant products/parts. Thus, the blockchain 180 can facilitate tracking the manufacturing of a product and thereby support the purpose of the gratitude system 100 to connect the workers with the consumers by helping identify relevant segments of video from the sensor data and associated workers for a given product. Additional aspects of how the monitoring module 120 functions to perform the noted functions will be discussed in detail subsequently.

As one example of the context within which the gratitude system 100 can be implemented, consider FIG. 2. FIG. 2 illustrates a diagram 200 representing a manufacturing context for vehicles. As shown, multiple different production lines 205a, 205b, and 205c are monitored by sensors 210a, 210b, and 210c within a manufacturing facility 215. It should be appreciated that the diagram 200 is for purposes of discussion, and the manufacturing facility 215 may include additional or fewer production lines, and the sensors may be more numerous than what is shown. Moreover, the production lines may be supplemented by additional upstream production facilities that are also monitored by the gratitude system 100. That is, the gratitude system 100 communicates with sensors (e.g., 210a, 210b, 210c) with separate facilities and further tracks production using the blockchain 180. This process generally involves acquiring the sensor data 150 along with metadata that is used to populate the blockchain 180 about the manufacturing process. This data is then communicated to the gratitude system 100 that can perform the process of generating the videos 170 and providing the videos to appropriate devices/parties for display.

For example, as shown, a delivery facility 220 (e.g., a car dealership) delivers a product to a consumer 230 and may monitor the delivery process using a sensor 225. The sensor 225 may be a collection of cameras that capture the consumer 230 receiving the product and viewing the combined video about the manufacturing process. The sensors 225 may include statically mounted sensors, mobile sensors used by a delivery worker, mobile sensors within an electronic device viewed by the consumer 230, sensors within the product (e.g., a vehicle), and so on. In general, the gratitude system 100 leverages available sensors in order to capture the reaction of the consumer 230 to the product so that the gratitude of the consumer is captured for conveyance back to the workers.

Further, while FIG. 2 is presented in relation to vehicle production and a dealership, in further arrangements, the gratitude system 100 can be implemented within different contexts, such as toy manufacturing for children, electronics manufacturing, food preparation, and so on. Within the context of food preparation, the system 100 may further integrate health analysts to analyze an individual's specific nutritional requirements, doctors, chefs, and others that have relevant input in relation to what a specific consumer is eating. Moreover, in this same example of food production, the gratitude system 100 may extend tracking all the way to farming, including the planting, harvesting, and general cultivation of different food sources (e.g., grains, vegetables, meats, etc.). Thus, the gratitude system 100 can extend to many different contexts in order to improve the connection of producers/workers with end consumers.

Figure 3:
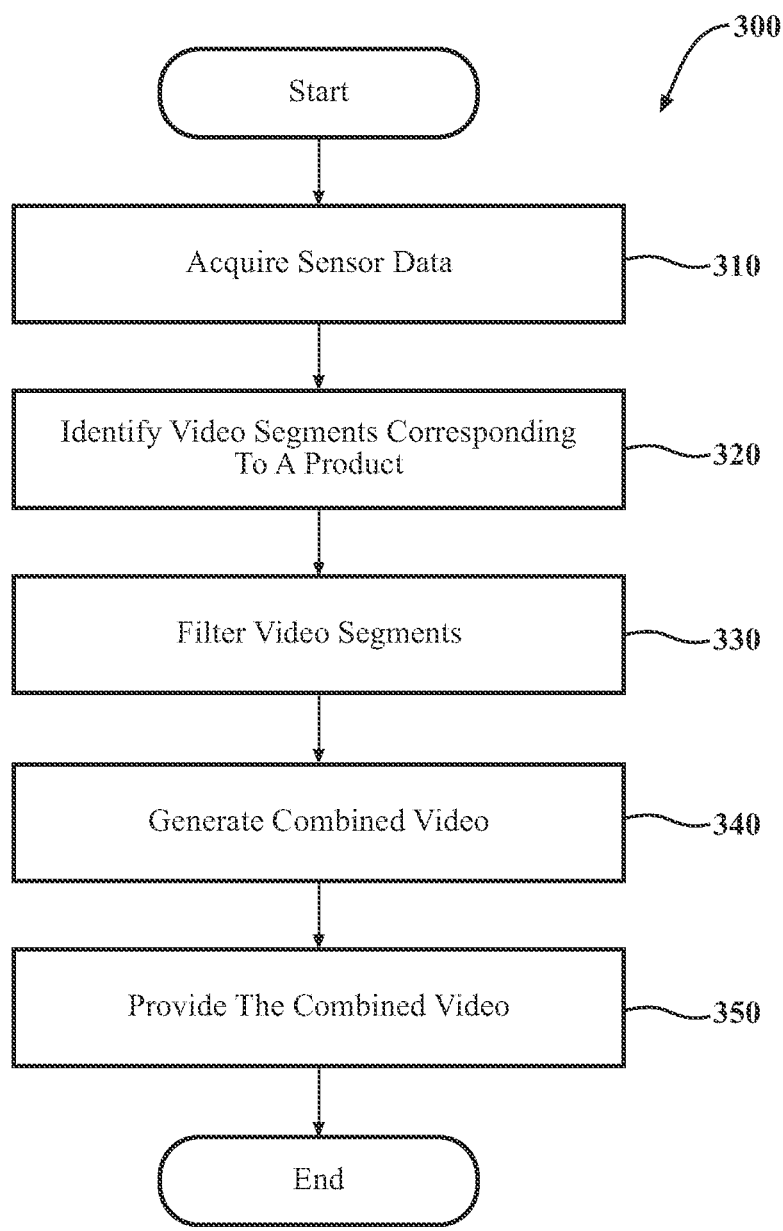
FIG. 3 illustrates one embodiment of a method associated with an improved approach to providing gratitude by generating a video of a manufacturing process.

Additional aspects of providing gratitude between workers and consumers will be discussed in relation to FIGS. 3-4. FIG. 3 illustrates a flowchart of a method 300 that is associated with tracking a manufacturing process and generating a combined video about the manufacturing process. Method 300 will be discussed from the perspective of the gratitude system 100 of FIG. 1. While method 300 is discussed in combination with the gratitude system 100, it should be appreciated that the method 300 is not limited to being implemented within the gratitude system 100 but is instead one example of a system that may implement the method 300.

At 310, the monitoring module 120 acquires the sensor data 150. In one arrangement, the monitoring module 120 controls one or more cameras that are present at a location of the manufacturing/creation of separate stages of the product. For example, a manufacturing facility may include statically mounted cameras that acquire source video of manufacturing of different stages of a product. As one example, the different stages can include forging/forming of individual component parts from raw materials, assembly of subassemblies, and assembly of the final product. It should be appreciated that the separate stages can vary widely according to the particular product that is being created (e.g., food versus a vehicle). In any case, the monitoring module 120 acquires the sensor data 150 to collect a comprehensive assessment of the manufacturing process.

In addition to image data about the manufacturing process, the monitoring module 120 can further acquire information for tracking components of the product. For example, the monitoring module 120 can also acquire component part information from RF readers that acquire information from embedded RFIDs. In further approaches, the monitoring module 120 may acquire infrared video of the components/parts, ultrasonic data, and so on. In general, any information that is available during the manufacturing of the product in the form of direct observations from the sensor data 150 or as metadata from logged information (e.g., timestamps, ID numbers, etc.) can be acquired by the monitoring module 120 and logged into the blockchain 180. As such, the monitoring module 120 can further track the manufacturing of the product in addition to generating the noted videos.

At 320, the monitoring module 120 identifies segments from the source video (i.e., video acquired as part of the sensor data 150) associated with an individual product. It should be appreciated that in some instances, video about the manufacturing may capture steps for multiple products (e.g., processing bulk raw materials into a refined state) in a single video while in other instances, a video segment may include information about a single product (e.g., final assembly of a vehicle). Thus, the monitoring module 120 analyzes the sensor data 150 to correlate portions of the source video with components of the product and thereby identify video about separate manufacturing stages of the product.

In one arrangement, the monitoring module 120 analyzes the sensor data 150 to identify separate components of a product. For example, video of the manufacturing may include visual indicators (e.g., fiducials) for identifying a specific part. In further arrangements, the video may include tags indicating the presence of a component in a particular segment of video. In yet a further approach, the monitoring module 120 analyzes the blockchain 180 to determine which video segments correspond to the production of an individual product as identified according to video linked into the blockchain 180 and/or additional identifiers specified within the blockchain 180 (e.g., video identifiers and timestamps).

At 330, the monitoring module 120 filters the segments identified at 320. In one arrangement, the monitoring module 120 filters the segments so that the resulting combined video can focus on workers interacting with the product and performing tasks in relation to the completion of manufacturing. Moreover, as with any visual medium, some of the images may capture the worker out of frame, in odd poses, with odd expressions, and so on. As such, the filtering focuses on determining which of the segments best capture the interaction of the workers with the product while avoiding undesirable segments where the workers has an unsatisfied expression or ill pose. Thus, the monitoring module 120, in one arrangement, implements a content threshold. The content threshold defines unsatisfied or undesirable expressions of the worker, unwanted poses (e.g., out of frame, positioned with a face that is unviewable, etc.). Accordingly, the monitoring module 120 can apply the perception model 160 to determine characteristics of the segments, such as facial expressions, and so on. From this information, the monitoring module 120 can perform a comparison with the content threshold to determine whether a segment satisfies the content threshold (i.e., the worker is visible, depicts acceptable expressions, poses, etc.) or not. In this way, the monitoring module 120 can select segments to include within a combined video while removing other segments that are generally undesirable.

At 340, the monitoring module 120 generates a combined video from the segments selected at 330. In one arrangement, the monitoring module 120 generating the combined video by splicing together the selected segments as a highlight of the manufacturing of the product. Thus, the combined video generally depicts the manufacturing of the product throughout a whole process and includes the workers in order to show the involvement of the workers in creating the product. In various approaches, the form of the combined video itself may vary. That is, the monitoring module 120 may emphasize different stages of the manufacturing process, generate the video with a particular selected length according to a desired amount of detail, and so on. In any case, the monitoring module 120 generates the combined video to show portions of the manufacturing process for an individual product that is purchased by a particular consumer so that the combined video is customized for that individual product and shows the specific workers that created the product for the consumer.

At 350, the monitoring module 120 provides the combined video to the consumer associated with the product. In one arrangement, the monitoring module 120 displays the combined video to the consumer on an electronic display. The particular form and location of the display may vary according to the implementation. For example, in the context of a vehicle, the display may be within the vehicle itself, within a dealership where the vehicle is delivered or in another suitable location. In the context of other products, such as electronics, for example, the monitoring module 120 cause the combined video to display on the product itself. In general, the product is displayed to the consumer as the consumer first interacts with and/or sees the product in order to provide for capturing a reaction of the consumer, as discussed in more detail with the method 400 subsequently.

Figure 4:
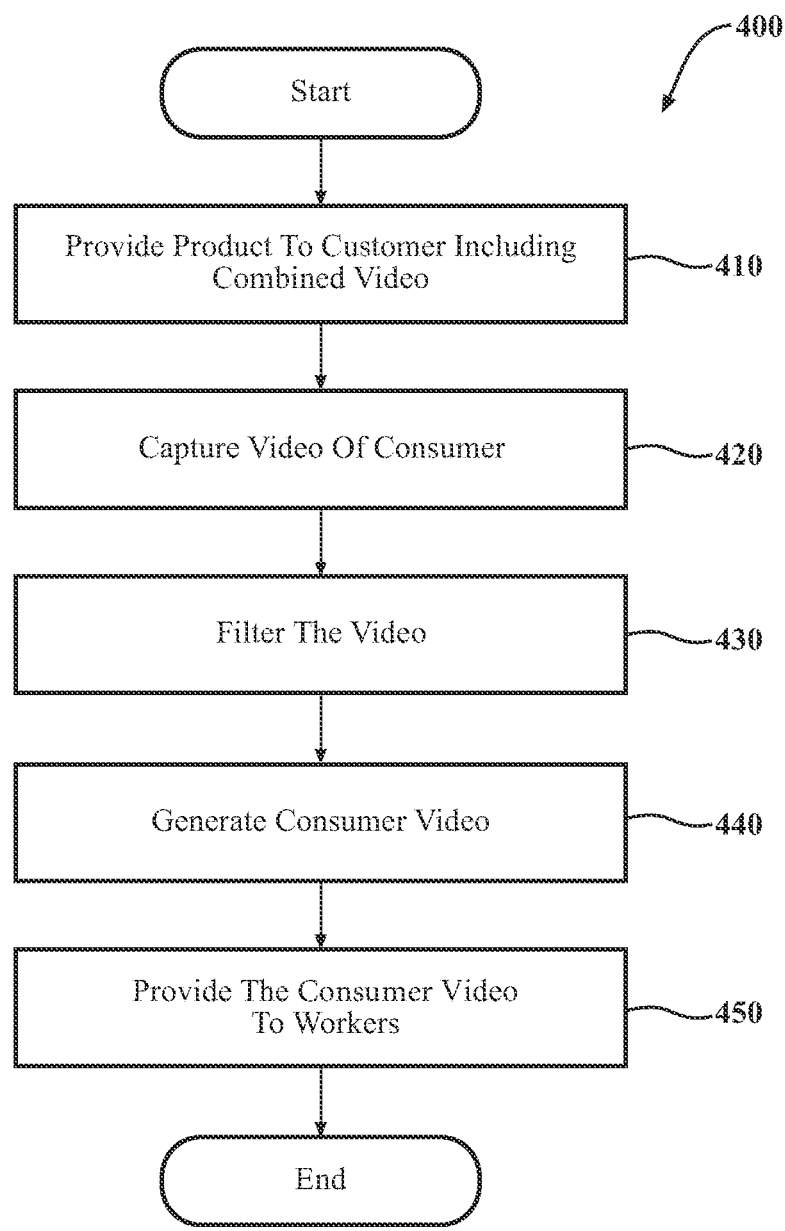
FIG. 4 illustrates one embodiment of a method associated with an improved approach to providing gratitude by generating a video of a consumer acquiring a product.

FIG. 4 illustrates a flowchart of a method 400 that is associated with capturing a reaction of a consumer to a product and delivering the reaction to workers that created the product. Method 400 will be discussed from the perspective of the gratitude system 100 of FIG. 1. While method 400 is discussed in combination with the gratitude system 100, it should be appreciated that the method 400 is not limited to being implemented within the gratitude system 100 but is instead one example of a system that may implement the method 400.

At 410, a product is provided to the consumer, including the combined video, as discussed at 350 of method 300. That is, in one arrangement, the monitoring module 120 causes the combined video to be displayed to the consumer, which may occur on the product, or on a display that is nearby the product. In any case, the display of the combined video is generally coordinated with the delivery of the product to the consumer.

At 420, the monitoring module 120 captures additional sensor data about the consumer receiving the product and/or watching the combined video. In one arrangement, the monitoring module 120 controls an embedded camera of the product (e.g., a vehicle, an electronic device, etc.) to acquire video when the consumer receives the product. In further approaches, the monitoring module 120 acquires video of the consumer from a salesperson that manually operates a camera to capture the consumer. In still further approaches, the monitoring module 120 controls one or more static cameras that are mounted within an environment in which the consumer is taking possession of the product. In general, the monitoring module 120 captures the video to track a reaction of the consumer to the product.

At 430, the monitoring module 120 filters the acquired video. In general, the filtering that occurs at 430 is similar to the filtering at 330 of method 300. For example, the monitoring module 120 can determine which segments of the video about the consumer present the consumer in a positive manner. That is, the monitoring module 120 can apply the perception model 160 to identify when the consumer is viewable within a frame of the video, when the facial expressions of the consumer are positive (e.g., smiling, satisfied, etc.), and so on. Accordingly, in a similar manner as discussed at 330, the monitoring module 120 can apply the content threshold to determine when segments of the video depict the consumer in a positive manner. In this way, the monitoring module 120 can filter the separate segments of the acquired video and select segments that provide highlights of the experience.

At 440, the monitoring module 120 generates a consumer video of the consumer receiving the product according to the selected segments of the acquired video. In a similar manner as discussed in regards to 340, the monitoring module 120 joins the selected segments to form a video of highlights in the form of a consumer video. In general, the consumer video is intended to capture the gratitude of the consumer to the workers for the product. Thus, the consumer video generally includes smiles and satisfied expressions of the consumer toward the product and/or in relation to the combined video of the manufacturing process of the product.

At 450, the monitoring module 120 provides the consumer video to one or more workers from the manufacturing facility that manufactured the product. In one arrangement, the monitoring module 120, after generating the consumer video, causes the consumer video to be displayed to the workers. That is, the monitoring module 120 may communicate the consumer video to an electronic device associated with the worker for display, may automatically display the consumer video on a display within the manufacturing facility, and so on. In general, the consumer video is provided as a response to the worker manufacturing the product so that the worker can realize the enjoyment of their efforts in creating the product. In this way, the gratitude system 100 provides for connecting the workers with the consumers in a personal way so that each party can appreciate the other in their efforts and enjoyment of the product.

Figure 5:
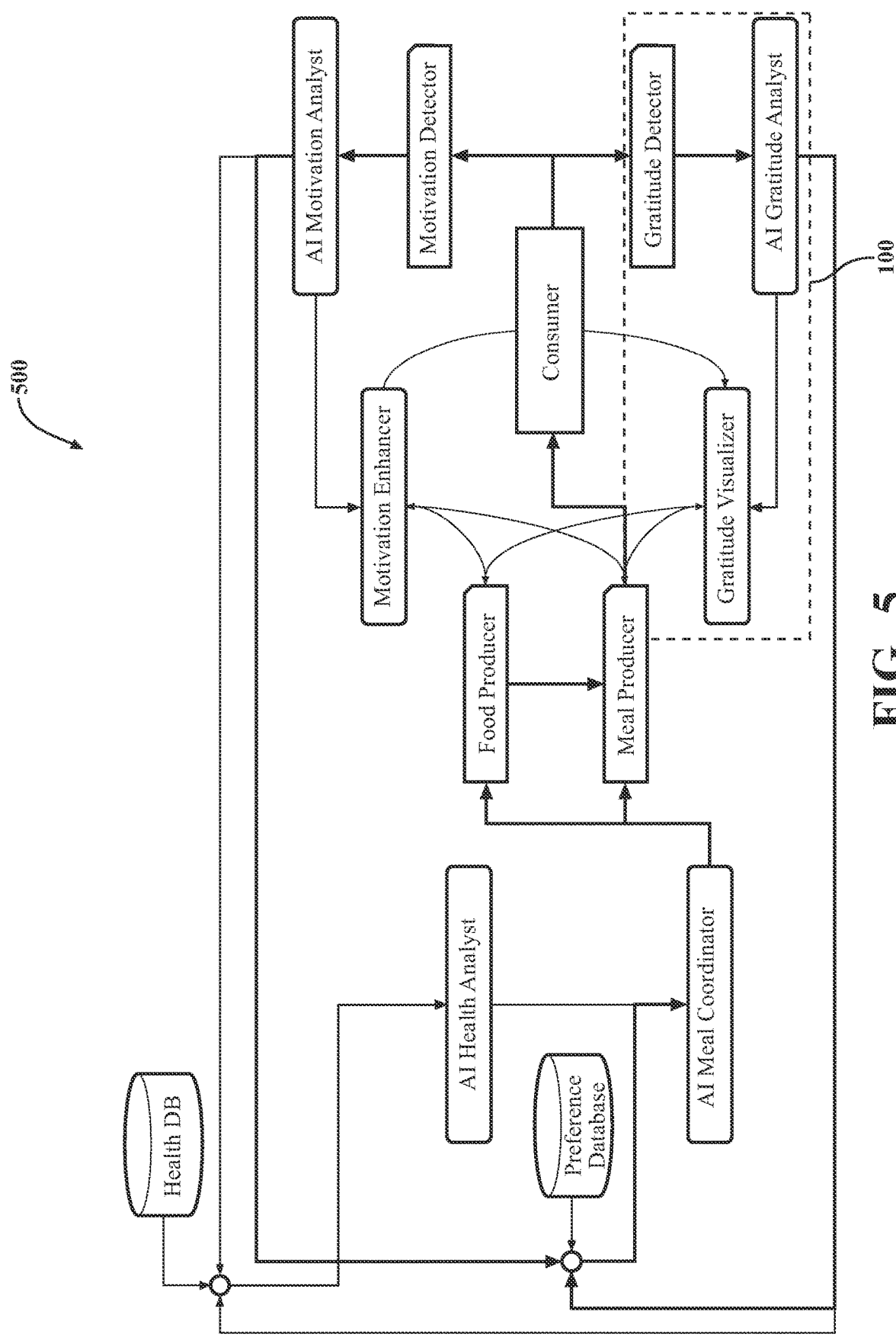
FIG. 5 illustrates one example of a system relating to the production of meals in which the disclosed system may be implemented.
Figure 6:
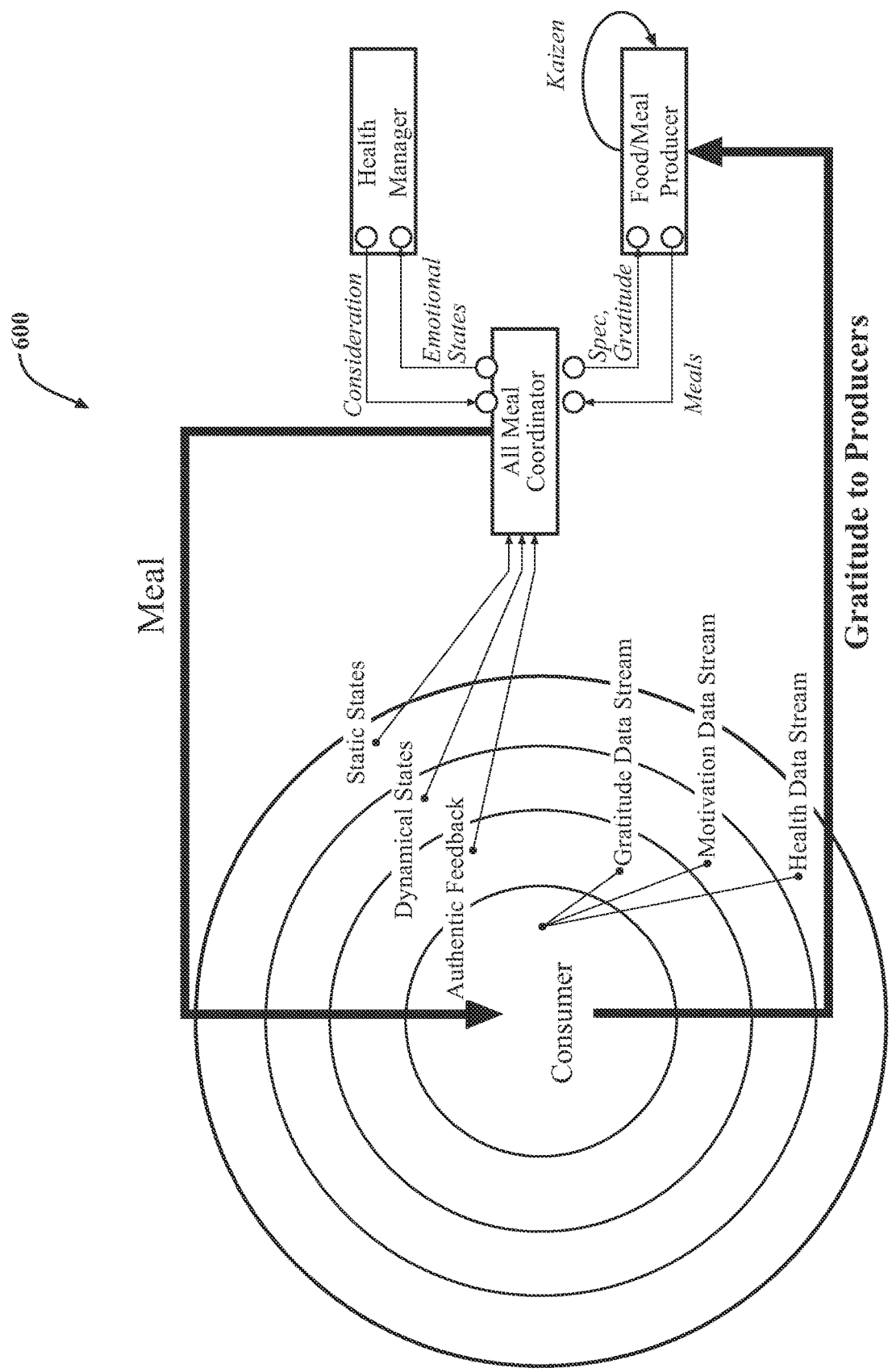
FIG. 6 illustrates one example of relationships of a consumer to producers.

As a further example of how the gratitude system 100 connects consumers with workers to provide gratitude for the product, consider FIGS. 5-6. FIGS. 5-6 generally relate to a food/meal production context that may involve additional parties beyond the workers actually creating the food. For example, the systems may process input from health analysts/managers (e.g., nutritionists, nurses, doctors, etc.), and so on. FIG. 5 illustrates a system 500 in which the gratitude system 100 may operate. As shown, the system 500 includes the gratitude system 100, which is separated into separate functional components, along with further component systems, such as a motivation analysis/enhancement system, and a meal coordinator. In any case, the overall system 500 relates to producing meals for a consumer. As shown, the system 500 can provide inputs in the form of health information for the consumer from a health database that are analyzed by a health analyze along and a meal coordinator to plan meals for the consumer. Accordingly, this information can then be provided to producers of both the food and the final meals to coordinate the production.

The gratitude system 100 functions in parallel with the other component systems to, for example, track the input of each separate entity in the chain that ultimately produces the meals for the consumer. Thus, as one example, the gratitude system 100 may track efforts by the food producer and the meal producer. Tracking these entities may include capturing various data (e.g., video) about growing/cultivating/harvesting the food, and creating meals from the food. As such, the separate producers may provide video of different stages in the process and/or the gratitude system 100 may automatically collect video from sensors at locations associated with the producers in order to capture video about different stages in the production of the meals. Once captured, the gratitude system 100 performs generates the combined video, as discussed previously according to the AI gratitude analyst, the gratitude detector, and the gratitude visualizer to ultimately display the combined video about the production of the meal to the consumer. As further described previously, the gratitude system 100 can then capture a reaction of the consumer. In the instant context, the gratitude system 100 captures the reaction of the consumer to the meal. That is, the gratitude system 100 captures video of the consumer first seeing the meal, eating the meal, and/or watching the combined video about the production of the meal. This information is then similarly used to create a consumer video that is provided back to the producers. In his way, the gratitude system 100 provides for conveying the gratitude of the consumer back to the producers so that the producers can better realize the benefits of their hard work.

FIG. 6 further illustrates how the gratitude system 100 facilitates the conveyance of gratitude back to producers. FIG. 6 shows a diagram 600, including relationships between the consumer and workers/producers that provide products and/or services to the consumer. As shown, the gratitude system 100 provides for conveying the gratitude to the producers from the consumer and further supports conveyance of gratitude to the health manager. In any case, the gratitude system 100 generally functions to better connect the people that create products and provide services to a consumer by facilitating the conveyance of gratitude and consideration between the parties. In this way, the emotional health and well-being of all involved parties improves.

Detailed embodiments are disclosed herein. However, it is to be understood that the disclosed embodiments are intended only as examples. Therefore, specific structural and functional details disclosed herein are not to be interpreted as limiting but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-6, but the embodiments are not limited to the illustrated structure or application.

The flowcharts and block diagrams in the Figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product that comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Generally, module, as used herein, includes routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions. The term "operatively connected" and "communicatively coupled," as used throughout this description, can include direct or indirect connections, including connections without direct physical contact.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™ Smalltalk, C++ or the like and conventional procedural programming languages, such as the "C" programming language or similar programming languages. The program code may execute entirely on the user's computer, partly on the user's computer, as a standalone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A gratitude system, comprising:
a memory communicably coupled to a processor and storing:
a monitoring module including instructions that, when executed by the processor, cause the processor to:
acquire, from a camera within a manufacturing facility, source video of manufacturing of different stages of a product;
identify, from the source video, segments associated with the product;
generate a combined video from the segments, including filtering the segments to highlight a worker involved with generating the product when an expression of the worker satisfies a content threshold;
provide the combined video to a consumer associated with the product; and
provide the consumer video to the worker from the manufacturing facility that manufactured the product.

2. The gratitude system of claim 1, wherein the monitoring module includes instructions to identify the segments including instructions to correlate portions of the source video with components of the product to identify separate manufacturing stages of the product in the source video.

3. The gratitude system of claim 1, wherein the monitoring module includes instructions to acquire the source video including instructions to track components of the product and the segments from the source video using a blockchain, and
wherein the monitoring module includes instructions to generate the combined video including instructions to splice together selected ones of the segments to generate the combined video as a highlight of the manufacturing of the product including specific subcomponents included in the product.

4. The gratitude system of claim 1,
wherein the monitoring module includes instructions to filter the segments including instructions to apply a perception model to analyze the segments and identify i) when the worker is visible and ii) when the expression of the worker satisfies the content threshold.

5. The gratitude system of claim 4, wherein the content threshold defines unsatisfied expressions of the worker, and wherein filtering the segments includes removing portions of the source video associated with the unsatisfied expressions.

6. The gratitude system of claim 1, the monitoring module includes instructions to:
provide the consumer video to a worker from the manufacturing facility that manufactured the product.

7. The gratitude system of claim 1, wherein the monitoring module includes instructions to provide the combined video including instructions to display the combined video to the consumer when the consumer receives the product to provide for capturing a consumer video of a reaction of the consumer.

8. The gratitude system of claim 1, wherein the product is one of: an electronic device, a vehicle, and food.

9. A non-transitory computer-readable medium including instructions that, when executed by one or more processors, cause the one or more processors to:
acquire, from a camera within a manufacturing facility, source video of manufacturing of different stages of a product;
identify, from the source video, segments associated with the product;
generate a combined video from the segments, including filtering the segments to highlight a worker involved with generating the product when an expression of the worker satisfies a content threshold;
provide the combined video to a consumer associated with the product; and provide the consumer video to the worker from the manufacturing facility that manufactured the product.

10. The non-transitory computer-readable medium of claim 9, wherein the instructions to identify the segments include instructions to correlate portions of the source video with components of the product to identify separate manufacturing stages of the product in the source video.

11. The non-transitory computer-readable medium of claim 9, wherein the instructions to acquire the source video include instructions to track components of the product and the segments from the source video using a blockchain, and
wherein the instructions to generate the combined video include instructions to splice together selected ones of the segments to generate the combined video as a highlight of the manufacturing of the product including specific subcomponents included in the product.

12. The non-transitory computer-readable medium of claim 9,
wherein the instructions to filter the segments include instructions to apply a perception model to analyze the segments and identify i) when the worker is visible and ii) when the expression of the worker satisfies the content threshold.

13. The non-transitory computer-readable medium of claim 12, wherein the content threshold defines unsatisfied expressions of the worker, and wherein filtering the segments includes removing portions of the source video associated with the unsatisfied expressions.

14. A method, comprising:
acquiring, from a camera within a manufacturing facility, source video of manufacturing of different stages of a product;
identifying, from the source video, segments associated with the product;
generating a combined video from the segments, including filtering the segments to highlight a worker involved with generating the product when an expression of the worker satisfies a content threshold;
providing the combined video to a consumer associated with the product; and
providing the consumer video to the worker from the manufacturing facility that manufactured the product.

15. The method of claim 14, wherein identifying the segments includes correlating portions of the source video with components of the product to identify separate manufacturing stages of the product in the source video.

16. The method of claim 14, wherein acquiring the source video includes tracking components of the product and the segments from the source video using a blockchain, and
wherein generating the combined video includes splicing together selected ones of the segments to generate the combined video as a highlight of the manufacturing of the product including specific subcomponents included in the product.

17. The method of claim 14,
wherein filtering the segments includes applying a perception model to analyze the segments and identify i) when the worker is visible and ii) when the expression of the worker satisfies the content threshold.

18. The method of claim 17, wherein the content threshold defines unsatisfied expressions of the worker, and wherein filtering the segments includes removing portions of the source video associated with the unsatisfied expressions.

19. The method of claim 14, further comprising:
generating a consumer video of the consumer receiving the product according to acquired video.

20. The method of claim 14, wherein providing the combined video includes displaying the combined video to the consumer when the consumer receives the product to provide for capturing a consumer video of a reaction of the consumer.

* * * * *

UNITED STATES PATENT AND TRADEMARK OFFICE
CERTIFICATE OF CORRECTION

PATENT NO. : 11,810,355 B2
APPLICATION NO. : 17/379156
DATED : November 7, 2023
INVENTOR(S) : Heishiro Toyoda It is certified that error appears in the above-identified patent and that said Letters Patent is hereby corrected as shown below:

In the Specification

Column 1, Line 31, please remove "In one embodiment," and Capitalize "example".

In the Claims

Claim 1, Column 14, Line 14, please change "the consumer video" to "a consumer video".

Claim 9, Column 15, Line 1, please change "the consumer video" to "a consumer video".

Claim 14, Column 16, Line 5, please change "the consumer video" to "a consumer video".

Claim 19, Column 16, Line 29, please change "a consumer video" to "the consumer video".

Signed and Sealed this
Twenty-third Day of January, 2024

Katherine Kelly Vidal
Director of the United States Patent and Trademark Office